US006783111B2

(12) United States Patent
Cash et al.

(10) Patent No.: US 6,783,111 B2
(45) Date of Patent: Aug. 31, 2004

(54) DUAL LIFT SYSTEM

(75) Inventors: James T. Cash, Hackettstown, NJ (US); Ken Wendorf, Green Bay, WI (US); Glenn Schmidt, Green Bay, WI (US)

(73) Assignee: Megtec Systems Inc., DePere, WI (US)

(*) Notice: Subject to any disclaimer, the term of this patent is extended or adjusted under 35 U.S.C. 154(b) by 0 days.

(21) Appl. No.: 10/696,883

(22) Filed: Oct. 30, 2003

(65) Prior Publication Data

US 2004/0086822 A1 May 6, 2004

Related U.S. Application Data

(62) Division of application No. 10/230,240, filed on Aug. 28, 2002, now Pat. No. 6,669,472.

(51) Int. Cl.[7] .................................... F16K 25/02

(52) U.S. Cl. .................. 251/160; 251/172; 251/175; 251/188; 251/192; 137/311

(58) Field of Search ......................... 251/160, 172, 251/175, 188, 192; 137/309, 311; 432/179, 180, 181

(56) References Cited

U.S. PATENT DOCUMENTS

| | | | | |
|---|---|---|---|---|
| 2,219,994 A | | 10/1940 | Jung | 60/41 |
| 2,898,202 A | | 8/1959 | Houdry et al. | 23/288 |
| 2,946,651 A | | 7/1960 | Houdry | 23/2 |
| 4,676,744 A | | 6/1987 | Wray et al. | 432/181 |
| 4,770,857 A | | 9/1988 | Ludwig | 422/111 |
| 4,834,962 A | | 5/1989 | Ludwig | 423/351 |
| 5,016,547 A | * | 5/1991 | Thomason | 110/211 |
| 5,376,340 A | | 12/1994 | Bayer et al. | 422/175 |
| 5,503,551 A | | 4/1996 | Houston | 432/181 |
| 5,538,693 A | | 7/1996 | Olivier et al. | 422/111 |
| 5,540,584 A | | 7/1996 | Greco | 432/181 |
| 5,634,625 A | | 6/1997 | Bruno | 251/313 |
| 5,664,942 A | | 9/1997 | Bayer | 431/7 |
| 5,692,892 A | | 12/1997 | Houston | 432/181 |
| 5,692,893 A | | 12/1997 | Houston | 432/181 |
| 5,700,433 A | | 12/1997 | Somary | 422/171 |
| 5,833,938 A | | 11/1998 | Blazejewski | 422/175 |
| 5,837,205 A | | 11/1998 | Bayer et al. | 422/109 |
| 5,871,349 A | | 2/1999 | Johnson et al. | 432/180 |
| 5,888,063 A | | 3/1999 | Scott et al. | 432/181 |
| 6,039,927 A | | 3/2000 | Greco | 422/175 |
| 6,261,092 B1 | | 7/2001 | Cash | 432/179 |
| 6,669,472 B1 | * | 12/2003 | Cash et al. | 432/179 |

FOREIGN PATENT DOCUMENTS

| | | |
|---|---|---|
| DE | 3426662 | 1/1986 |
| DE | 4301748 | 7/1994 |
| DE | 19637090 | 12/1997 |
| DE | 19643821 | 1/1998 |
| DE | 19716877 | 12/1998 |
| DE | 4344700 | 1/1999 |
| DE | 19747905 | 1/1999 |
| DE | 19738678 | 3/1999 |
| EP | 0 117 564 | 2/1984 |
| EP | 0 137 670 | 8/1984 |
| EP | 0 222 463 | 1/1989 |
| EP | 0 218 590 | 3/1989 |
| EP | 0 365 262 | 10/1992 |
| EP | 0 587 064 | 9/1993 |
| EP | 0 548 630 | 5/1997 |
| EP | 0 702 195 | 5/1997 |
| EP | 0 719 984 | 5/1997 |
| EP | 0 715 706 | 5/1999 |
| EP | 0 811 143 | 11/1999 |

(List continued on next page.)

*Primary Examiner*—Jiping Lu
(74) *Attorney, Agent, or Firm*—Mitchell D. Bittman; Kevin S. Lemack

(57) ABSTRACT

Valve and valve lift system suitable for use in a regenerative thermal oxidizer, and oxidizer including the switching valve. The valve of the present invention exhibits excellent sealing characteristics and minimizes wear. In a preferred embodiment, the valve is sealed with pressurized air during its stationary modes, and unsealed during movement to reduce valve wear.

6 Claims, 19 Drawing Sheets

FOREIGN PATENT DOCUMENTS

| | | |
|---|---|---|
| EP | 0 697 562 | 12/1999 |
| GB | 2065855 | 3/1983 |
| GB | 2107445 | 2/1985 |
| GB | 2116306 | 8/1985 |
| GB | 2122329 | 9/1985 |
| GB | 2171178 | 11/1988 |
| GB | 2206682 | 1/1989 |
| GR | 880100286 | 5/1988 |
| SE | 503 802 | 3/1995 |
| WO | 84/04154 | 10/1984 |
| WO | 95/00809 | 1/1995 |
| WO | 96/24812 | 8/1996 |
| WO | 96/24813 | 8/1996 |
| WO | 96/41996 | 12/1996 |
| WO | 97/07374 | 2/1997 |
| WO | 97/21959 | 6/1997 |
| WO | 98/06993 | 2/1998 |
| WO | 98/06994 | 2/1998 |
| WO | 98/09491 | 3/1998 |
| WO | 98/44298 | 10/1998 |
| WO | 98/47592 | 10/1998 |

* cited by examiner

DUAL LIFT SYSTEM

This application is a divisional of Ser. No. 10/230,240 filed Aug. 28, 2002 now U.S. Pat. No. 6,669,472.

BACKGROUND OF THE INVENTION

Regenerative thermal oxidizers are conventionally used for destroying volatile organic compounds (VOCs) in high flow, low concentration emissions from industrial and power plants. Such oxidizers typically require high oxidation temperatures in order to achieve high VOC destruction. To achieve high heat recovery efficiency, the "dirty" process gas that is to be treated is preheated before oxidation. A heat exchanger column is typically provided to preheat these gases. The column is usually packed with a heat exchange material having good thermal and mechanical stability and sufficient thermal mass. In operation, the process gas is fed through a previously heated heat exchanger column, which, in turn, heats the process gas to a temperature approaching or attaining its VOC oxidation temperature. This pre-heated process gas is then directed into a combustion zone where any incomplete VOC oxidation is usually completed. The treated now "clean" gas is then directed out of the combustion zone and back through the heat exchange column or through a second heat exchange column. As the hot oxidized gas continues through this column, the gas transfers its heat to the heat exchange media in that column, cooling the gas and pre-heating the heat exchange media so that another batch of process gas may be preheated prior to the oxidation treatment. Regenerative thermal oxidizers often have at least two heat exchanger columns that alternately receive process and treated gases. This process is continuously carried out, allowing a large volume of process gas to be efficiently treated.

The performance of a regenerative oxidizer may be optimized by increasing VOC destruction efficiency and by reducing operating and capital costs. The art of increasing VOC destruction efficiency has been addressed in the literature using, for example, means such as improved oxidation systems and purge systems (e.g., entrapment chambers), and three or more heat exchangers to handle the untreated volume of gas within the oxidizer during switchover. Operating costs can be reduced by increasing the heat recovery efficiency, and by reducing the pressure drop across the oxidizer. Operating and capital costs may be reduced by properly designing the oxidizer and by selecting appropriate heat transfer packing materials.

An important element of an efficient oxidizer is the valving used to switch the flow of process gas from one heat exchange column to another. Any leakage of untreated process gas through the valve system will decrease the efficiency of the apparatus. In addition, disturbances and fluctuations in the pressure and/or flow in the system can be caused during valve switchover and are undesirable. Valve wear is also problematic, especially in view of the high frequency of valve switching in regenerative thermal oxidizer applications. Frequent valve repair or replacement is obviously undesirable.

One conventional two-column design uses a pair of poppet valves, one associated with a first heat exchange column, and one with a second heat exchange column. Although poppet valves exhibit quick actuation, as the valves are being switched during a cycle, leakage of untreated process gas across the valves inevitably occurs. For example, in a two-chamber oxidizer during a cycle, there is a point in time where both the inlet valve(s) and the outlet valve(s) are partially open. At this point, there is no resistance to process gas flow, and that flow proceeds directly from the inlet to the outlet without being processed. Since there is also ducting associated with the valving system, the volume of untreated gas both within the poppet valve housing and within the associated ducting represents potential leakage volume. Since leakage of untreated process gas across the valves leaves allows the gas to be exhausted from the device untreated, such leakage which will substantially reduce the destruction efficiency of the apparatus. In addition, conventional valve designs result in a pressure surge during switchover, which exasperates this leakage potential.

Rotary style valves have been used to direct flow within regenerative thermal and catalytic oxidizers for the past ten years. These valves either move continuously or in a digital (stop/start) manner. In order to provide good sealing, mechanisms have been employed to keep constant force between the stationary components of the valve and the rotating components of the valve. These mechanisms include springs, air diaphragms and cylinders. However, excessive wear on various components of the valve often results.

It would therefore be desirable to provide a valve and valve system, particularly for use in a regenerative thermal oxidizer, and a regenerative thermal oxidizer having such a valve and system, that ensures proper sealing and reduces or eliminates wear.

It also would be desirable to provide and valve and valve system wherein the sealing pressure can be precisely controlled.

SUMMARY OF THE INVENTION

The problems of the prior art have been overcome by the present invention, which provides a lift system for a switching valve, the switching valve, and a regenerative thermal oxidizer including the lift system and switching valve. The valve of the present invention exhibits excellent sealing characteristics and minimizes wear. The lift system assists the valve in rotating with minimal friction and providing a tight seal when it is stationary. In a preferred embodiment, the sealing force of the valve against the valve seat is reduced during switching to reduce the contact pressure between the moving components and the stationary components, thus resulting in less required torque to move the valve.

For regenerative thermal oxidizer applications, the valve preferably has a seal plate that defines two chambers, each chamber being a flow port that leads to one of two regenerative beds of the oxidizer. The valve also includes a switching flow distributor that provides alternate channeling of the inlet or outlet process gas to each half of the seal plate. The valve operates between two modes: a stationary mode; and a valve movement mode. In the stationary mode, a tight gas seal is used to minimize or prevent process gas leakage. In accordance with the present invention, during valve movement, the sealing pressure is reduced or eliminated, or a counter-pressure or counter-force is applied, to facilitate valve movement and reduce or eliminate wear. The amount of sealing pressure used can be precisely controlled depending upon process characteristics so as to seal the valve efficiently.

DETAILED DESCRIPTION OF THE PRESENT INVENTION

Although the majority of the following description illustrates the use of the lift system of the present invention in the context of the switching valve of U.S. Pat. No. 6,261,092 (the disclosure of which is hereby incorporated by reference), it is noted that the invention is not intended to be limited to any particular valve and can be employed in any valve system where sealing is carried out.

Figure 1:
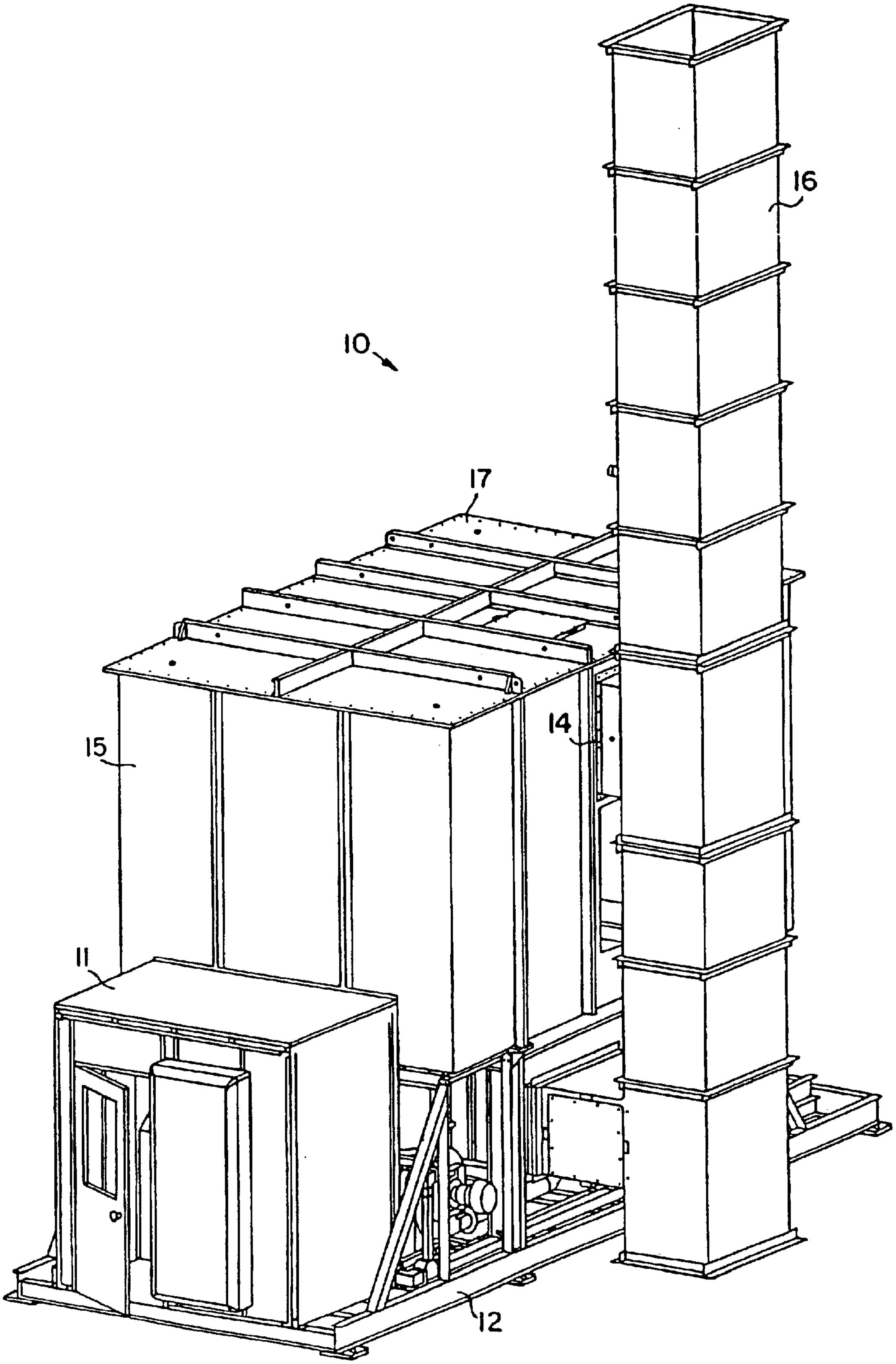
FIG. 1 is a perspective view of a regenerative thermal oxidizer in accordance with one embodiment of the present invention.
Figure 2:
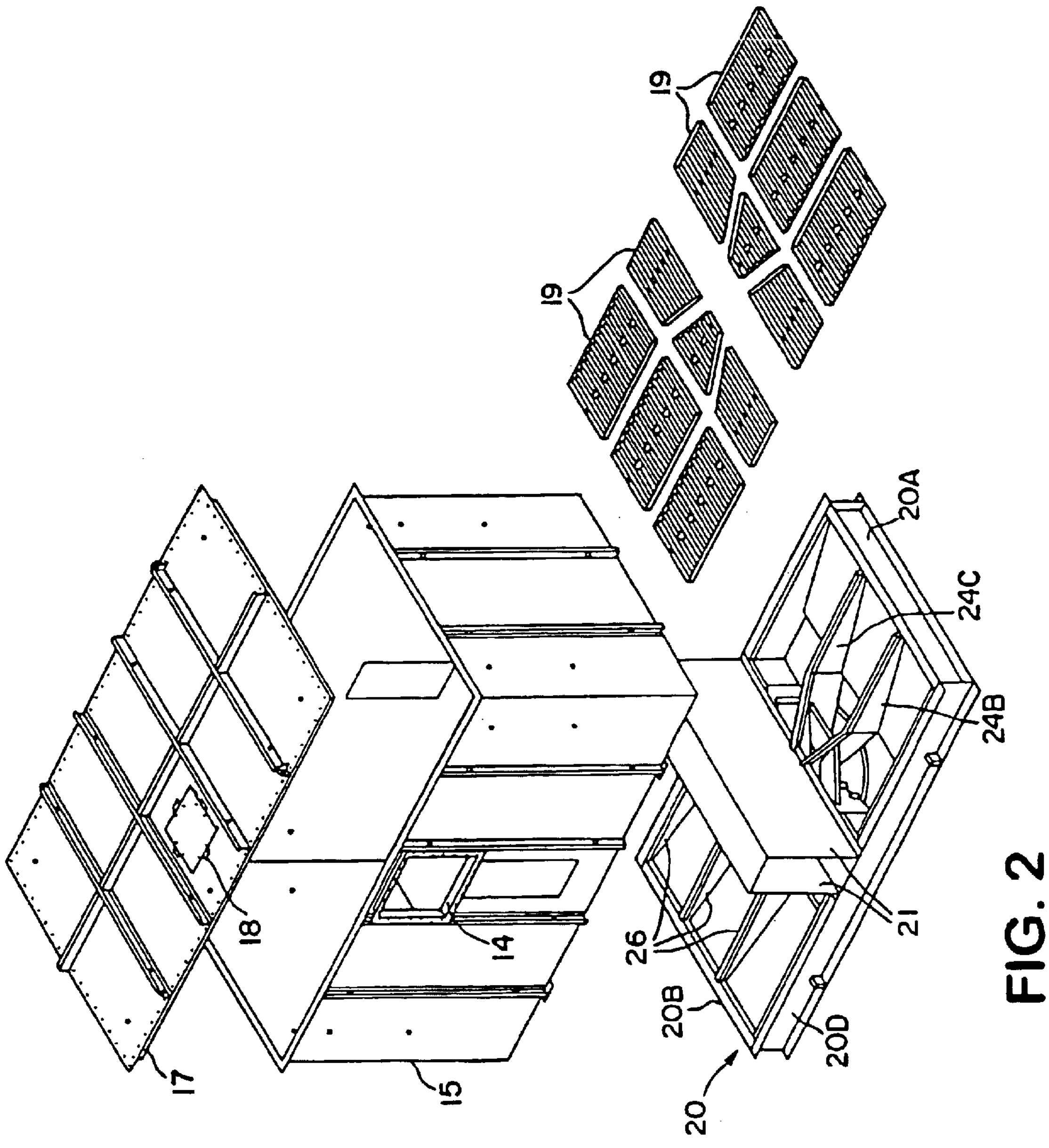
FIG. 2 is a perspective exploded view of a portion of a regenerative thermal oxidizer in accordance with one embodiment of the present invention.

Familiarity with the valve disclosed in the '092 patent is assumed. Briefly, FIGS. 1 and 2 show a two-chamber regenerative thermal oxidizer 10 (catalytic or non-catalytic) supported on a frame 12 as shown. The oxidizer 10 includes housing 15 in which there are first and second heat exchanger chambers in communication with a centrally located combustion zone. A burner (not shown) may be associated with the combustion zone, and a combustion blower may be supported on the frame 12 to supply combustion air to the burner. The combustion zone includes a bypass outlet 14 in fluid communication with exhaust stack 16 typically leading to atmosphere. A control cabinet 11 houses the controls for the apparatus and is also preferably located on frame 12. Opposite control cabinet 11 is a fan (not shown) supported on frame 12 for driving the process gas into the oxidizer 10. Housing 15 includes a top chamber or roof 17 having one or more access doors 18 providing operator access into the housing 15. Those skilled in the art will appreciate that the foregoing description of the oxidizer is for illustrative purposes only; other designs are well within the scope of the present invention, including oxidizers with more or less than two chambers, oxidizers with horizontally oriented chamber(s), and catalytic oxidizers. A cold face plenum 20 forms the base of housing 15 as best seen in FIG. 2. Suitable support grating 19 is provided on the cold face plenum 20 and supports the heat exchange matrix in each heat exchange column as is discussed in greater detail below. In the embodiment shown, the heat exchange chambers are separated by separation walls 21, which are preferably insulated. Also in the embodiment shown, flow through the heat exchange beds is vertical; process gas enters the beds from the valve ports located in the cold face plenum 20, flows upwardly (towards roof 17) into a first bed, enters the combustion zone in communication with the first bed, flows out of the combustion zone and into a second chamber, where it flows downwardly through a second bed towards the cold face plenum 20. However, those skilled in the art will appreciate that other orientations are suitable including a horizontal arrangement, such as one where the heat exchange columns face each other and are separated by a centrally located combustion zone.

Figure 3:
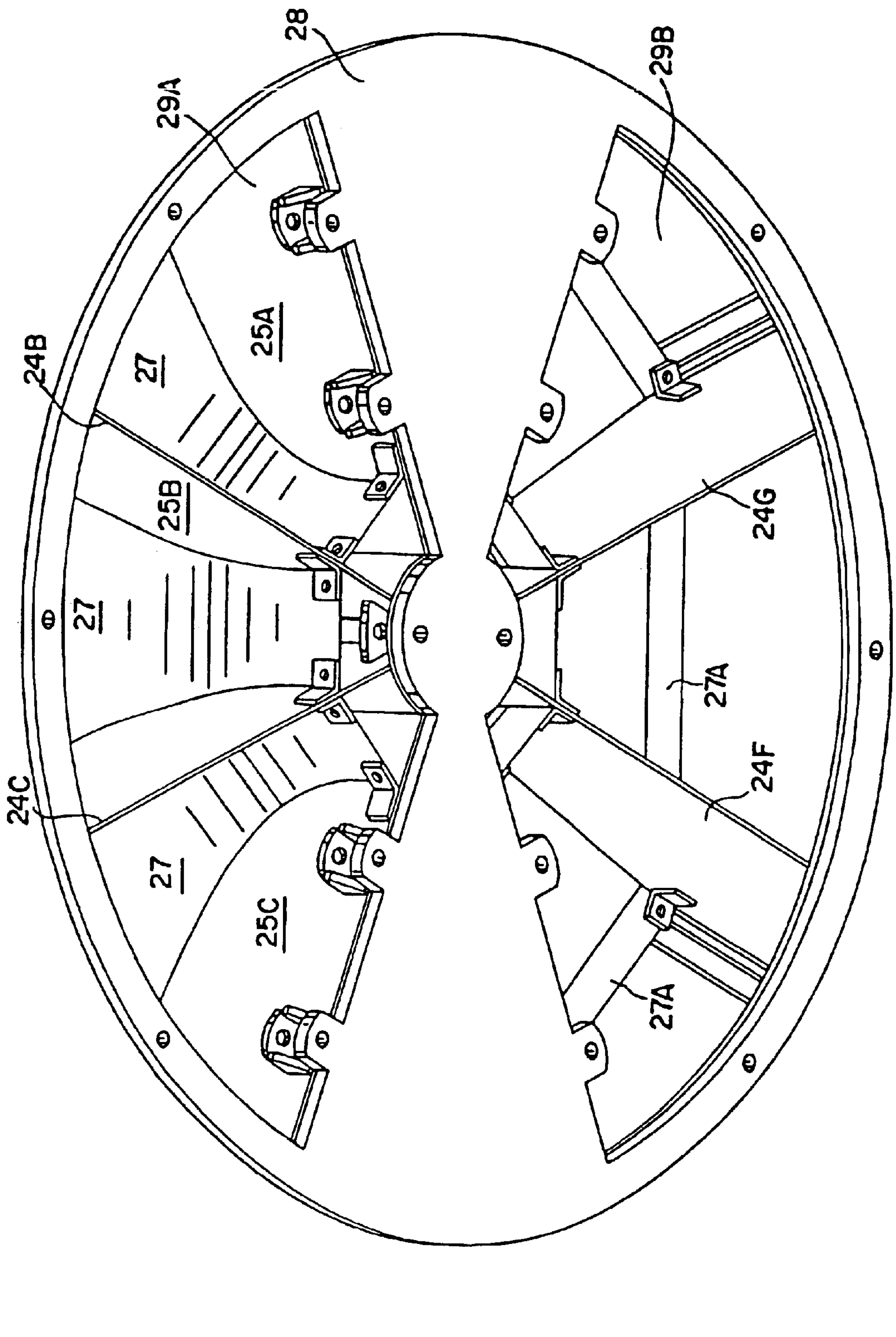
FIG. 3 is a bottom perspective view of valve ports forming part of a valve suitable for use with the present invention.

FIG. 3 is a view of the valve ports 25 from the bottom. Plate 28 has two opposite symmetrical openings 29A and 29B, which, with the baffles 26 (FIG. 2), define the valve ports 25. Situated in each valve port 25 is an optional turn vane 27. Each turn vane 27 has a first end secured to the plate 28, and a second end spaced from the first end secured to the baffle 24 on each side. Each turn vane 27 widens from its first end toward its second end, and is angled upwardly at an angle and then flattens to horizontal at 27A as shown in FIG. 3. The turn vanes 27 act to direct the flow of process gas emanating from the valve ports away from the valve ports to assist in distribution across the cold face plenum during operation. Uniform distribution into the cold face plenum 20 helps ensure uniform distribution through the heat exchange media for optimum heat exchange efficiency.

Figure 4:
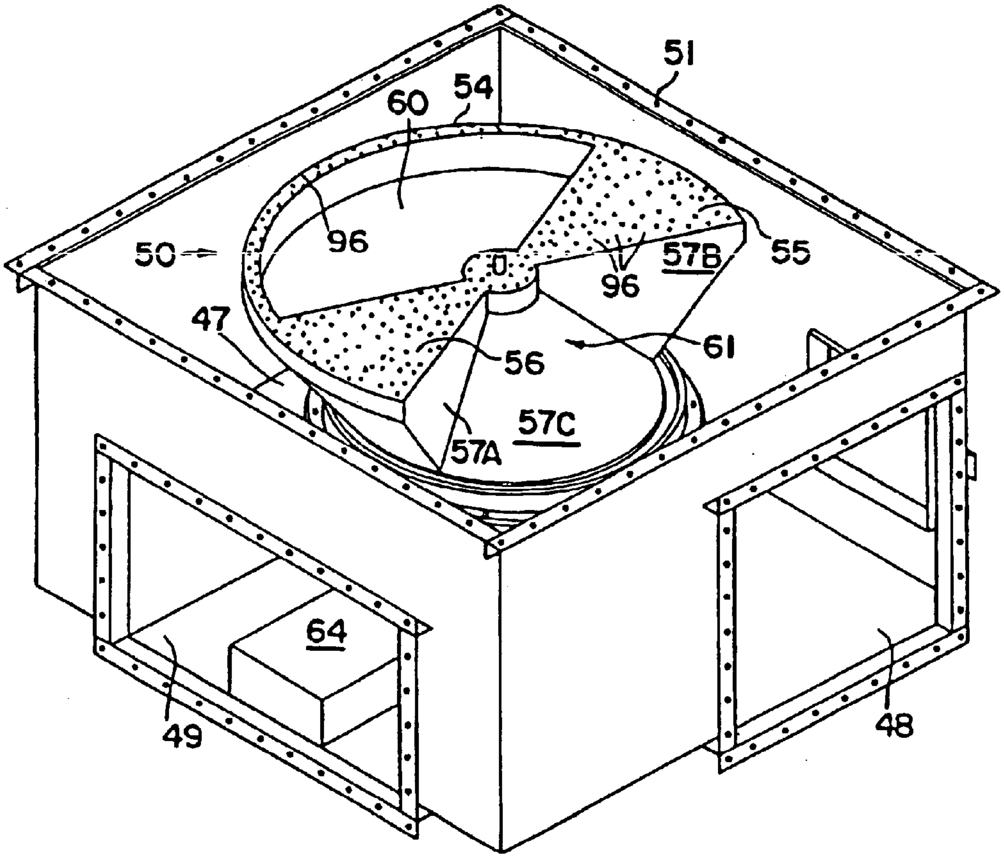
FIG. 4 is a perspective view of a flow distributor forming part of a switching valve suitable for use with the present invention.
Figure 4A:
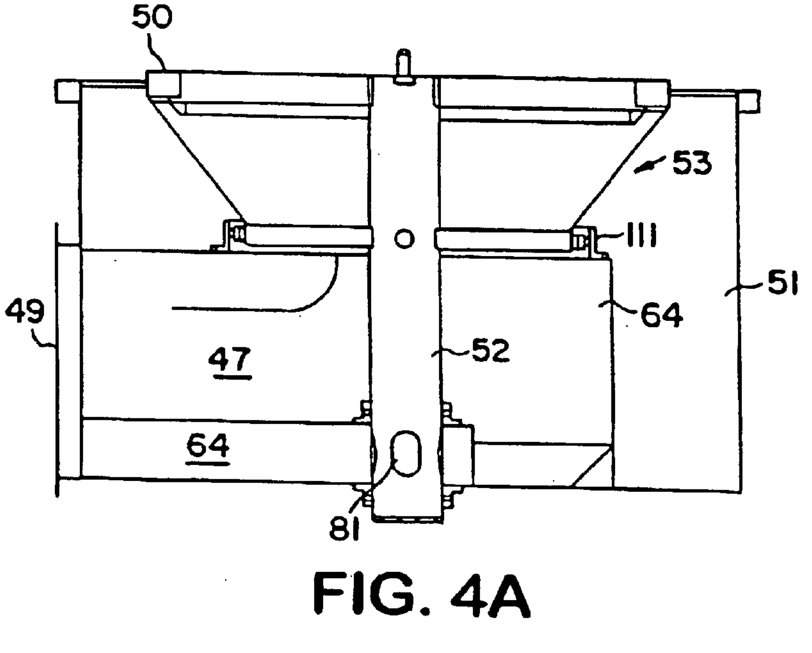
FIG. 4A is a cross-sectional view of the flow distributor of FIG. 4.

FIGS. 4 and 4A show the flow distributor 50 contained in a manifold 51 having a process gas inlet 48 and a process gas outlet 49 (although element 48 could be the outlet and 49 the inlet, for purposes of illustration the former embodiment will be used herein). The flow distributor 50 includes a preferably hollow cylindrical drive shaft 52 (FIGS. 4A, 5) that is coupled to a drive mechanism (detailed in FIGS. 8–10). Coupled to the drive shaft 52 is a partial frusto-conically shaped member 53. The member 53 includes a mating plate formed of two opposite pie-shaped sealing surfaces 55, 56, each connected by circular outer edge 54 and extending outwardly from the drive shaft 52 at an angle of 45°, such that the void defined by the two sealing surfaces 55, 56 and outer edge 54 defines a first gas route or passageway 60. Similarly, a second gas route or passageway 61 is defined by the sealing surfaces 55, 56 opposite the first passageway, and three angled side plates, namely, opposite angled side plates 57A, 57B, and central angled side plate 57C. The angled side plates 57 separate passageway 60 from passageway 61. The top of these passageways 60, 61 are designed to match the configuration of symmetrical openings 29A, 29B in the plate 28, and in the assembled condition, each passageway 60, 61 is aligned with a respective openings 29A, 29B. Passageway 61 is in fluid communication with only inlet 48, and passageway 60 is in fluid communication with only outlet 49 via plenum 47, regardless of the orientation of the flow distributor 50 at any given time. Thus, process gas entering the manifold 51 through inlet 48 flows through only passageway 61, and process gas entering passageway 60 from the valve ports 25 flows only through outlet 49 via plenum 47.

A sealing plate 100 (FIG. 6) is coupled to the plate 28 defining the valve ports 25 (FIG. 3). Preferably a gas seal, most preferably air, is used between the top surface of the flow distributor 50 and the seal plate 100, as discussed in greater detail below. The flow distributor is rotatable about a vertical axis, via drive shaft 52, with respect to the stationary plate 28. Such rotation moves the sealing surfaces 55, 56 into and out of blocking alignment with portions of openings 29A, 29B.

Figure 5:
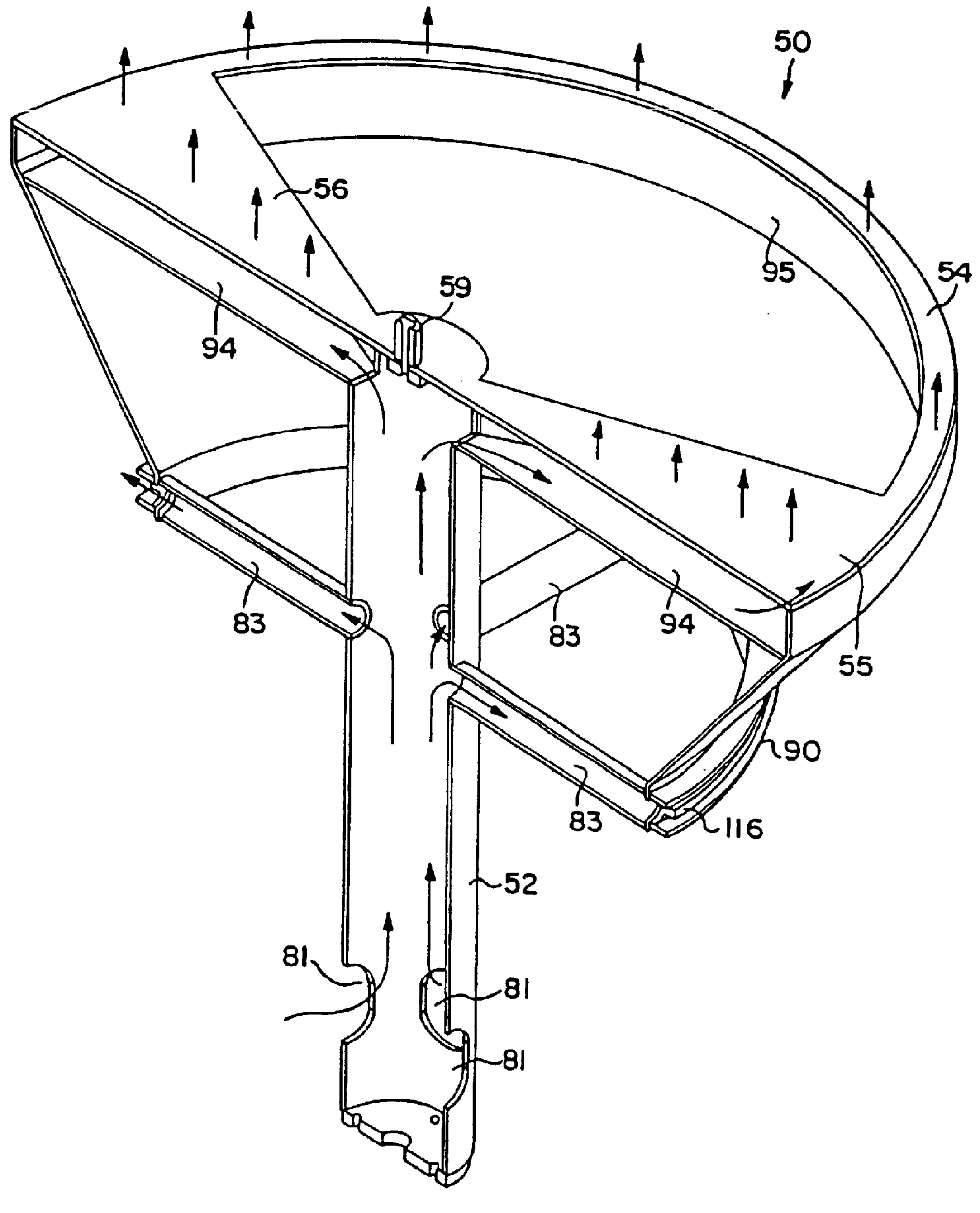
FIG. 5 is a perspective view of a portion of the flow distributor of FIG. 4.
Figure 6A:
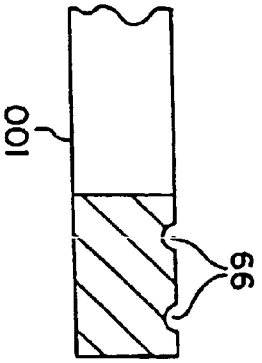
FIG. 6A is a cross-sectional view of a portion of the seal plate of FIG. 6.
Figure 6:
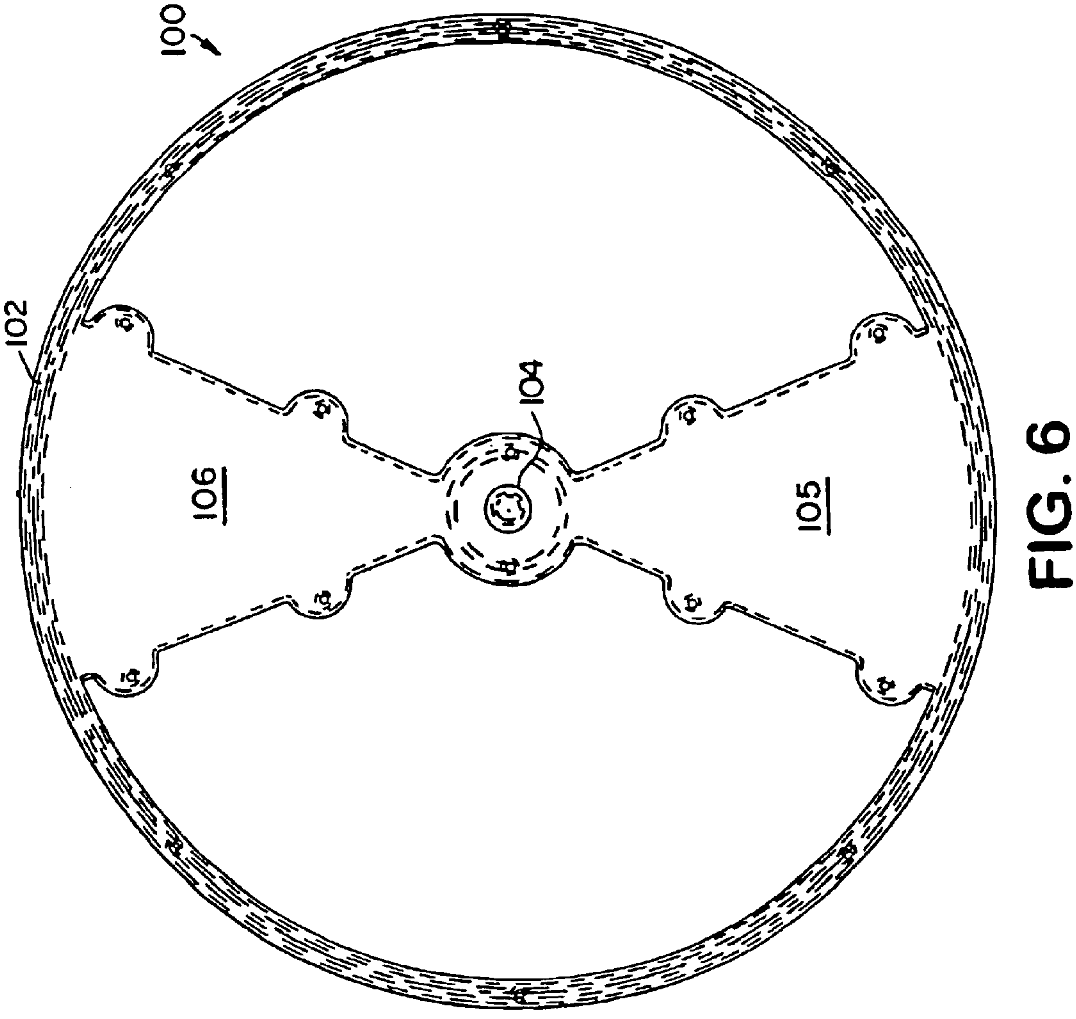
FIG. 6 is a top view of a seal plate of a valve suitable for use with the present invention.
Figure 7:
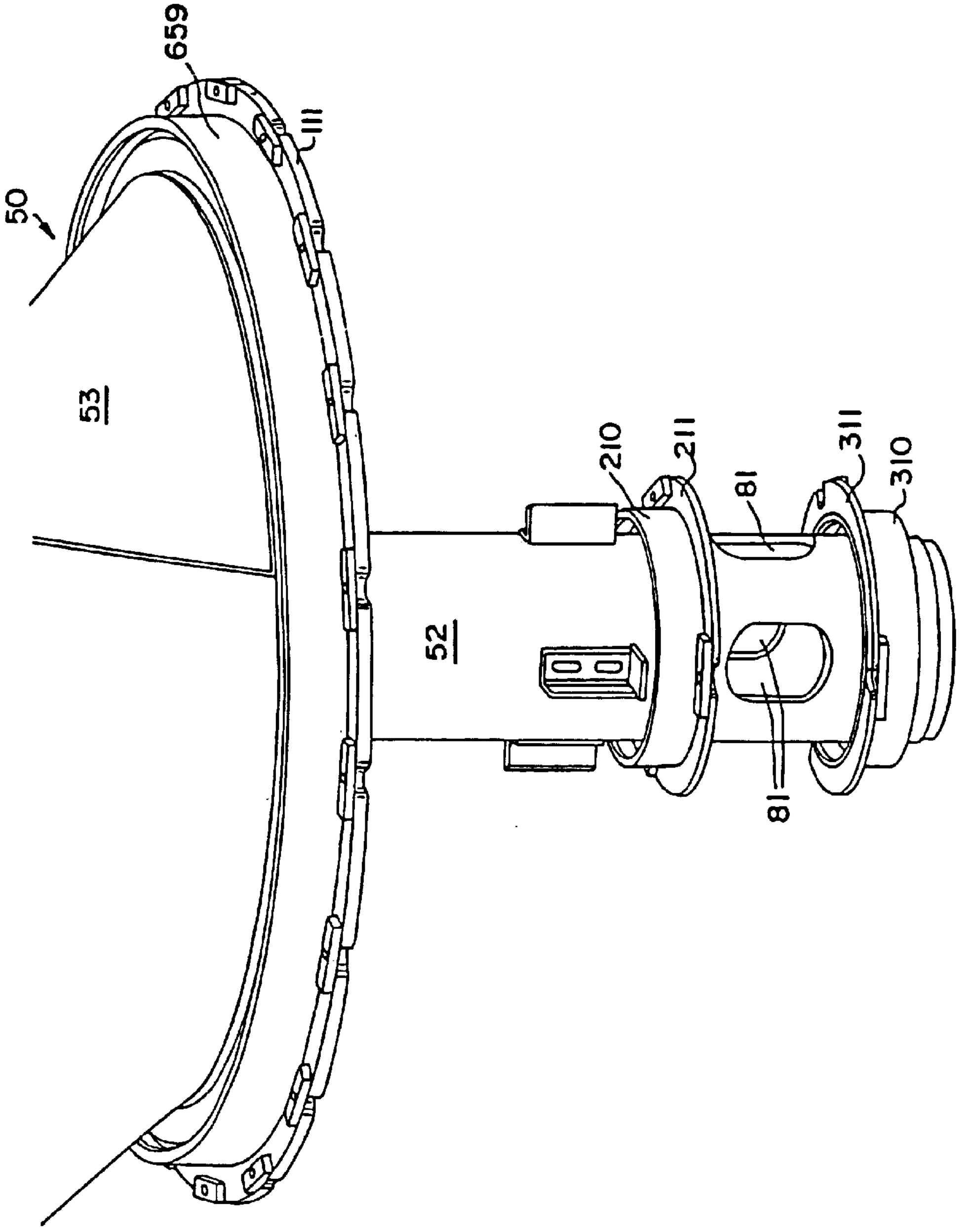
FIG. 7 is a perspective view of the shaft of the flow distributor of FIG. 4.

One method for sealing the valve will now be discussed first with reference to FIGS. 4, 6 and 7. The flow distributor 50 rides on a cushion of air, in order to minimize or eliminate wear as the flow distributor moves. Those skilled in the art will appreciate that gases other than air could be used, although air is preferred and will be referred to herein for purposes of illustration. A cushion of air not only seals the valve, but also results in frictionless or substantially frictionless flow distributor movement. A pressurized delivery system, such as a fan or the like, which can be the same or different from the fan used to supply the combustion air to the combustion zone burner, supplies air to the drive shaft 52 of the flow distributor 50 via suitable ducting (not shown) and plenum 64. As best seen in FIGS. 5 and 7, the air travels from the ducting into the drive shaft 52 via one or more apertures 81 formed in the body of the drive shaft 52 above the base 82 of the drive shaft 52 that is coupled to the drive mechanism 70. The exact location of the apertures(s) 81 is not particularly limited, although preferably the apertures 18 are symmetrically located about the shaft 52 and are equally sized for uniformity. The pressurized air flows up the shaft as depicted by the arrows in FIG. 5, and a portion enters on or more radial ducts 83 which communicate with and feed a ring seal located at the annular rotating port 90 as discussed in greater detail below. A portion of the air that does not enter the radial ducts 83 continues up the drive shaft 52 until it reaches passageways 94, which distribute the air in a channel having a semi-annular portion 95 and a portion defined by the pie-shaped wedges 55, 56. The mating surface of the flow distributor 50, in particular, the mating surfaces of pie-shaped wedges 55, 56 and outer annular edge 54, are formed with a plurality of apertures 96 as shown in FIG. 4. The pressurized air from channel 95 escapes from channel 95 through these apertures 96 as shown by the arrows in FIG. 5, and creates a cushion of air between the top surface of the flow distributor 50 and a stationary seal plate 100 shown in FIG. 6. The seal plate 100 includes an annular outer edge 102 having a width corresponding to the width of the top surface 54 of the flow distributor 50, and a pair of pie-shaped elements 105, 106 corresponding in shape to pie-shaped wedges 55, 56 of the flow distributor 50. It matches (and is coupled to) plate 28 (FIG. 3) of the valve port. Aperture 104 receives shaft pin 59 (FIG. 5) coupled to the flow distributor 50. The underside of the annular outer edge 102 facing the flow distributor includes one or more annular grooves 99 (FIG. 6A) which align with the apertures 96 in the mating surface of the flow distributor 50. Preferably there are two concentric rows of grooves 99, and two corresponding rows of apertures 96. Thus, the grooves 99 aid in causing the air escaping from apertures 96 in the top surface 54 to form a cushion of air between the mating surface 54 and the annular outer edge 102 of the seal plate 100. In addition, the air escaping the apertures 96 in the pie-shaped portions 55, 56 forms a cushion of air between the pie-shaped portions 55, 56 and the pie-shaped portions 105, 106 of the seal plate 100. These cushions of air minimize or prevent leakage of the process gas that has not been cleaned into the flow of clean process gas. The relatively large pie-shaped wedges of both the flow distributor 50 and the seal plate 100 provide a long path across the top of the flow distributor 50 that uncleaned gas would have to traverse in order to cause leakage. Since the flow distributor 50 is stationary the majority of time during operation, an impenetrable cushion of air is created between all of the mating surfaces of the valve.

Preferably the pressurized air is delivered from a fan different from that delivering the process gas to the apparatus in which the valve is used, so that the pressure of the sealing air is higher than the inlet or outlet process gas pressure, thereby providing a positive seal.

Figure 14:
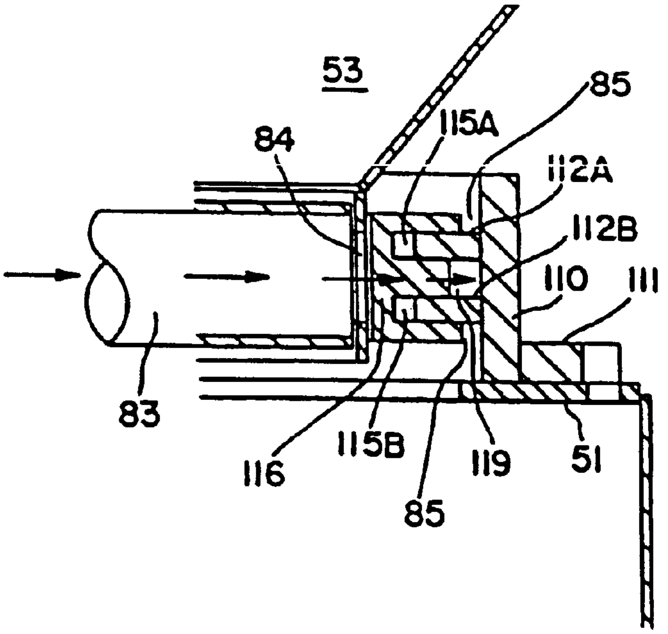
FIG. 14 is a cross-sectional view of the rotating port of a flow distributor suitable for use with the present invention.

The flow distributor 50 includes a rotating port as best seen in FIGS. 7 and 14. The frusto-conical section 53 of the flow distributor 50 rotates about an annular cylindrical wall 110 that functions as an outer ring seal. The wall 110 includes an outer annular flange 111 used to center the wall 110 and clamp it to the manifold 51 (see also FIG. 4). An E-shaped inner ring seal member 116 (preferably made of metal) is coupled to the flow distributor 50 and has a pair of spaced parallel grooves 115A, 115B formed in it. Piston ring 112A sits in groove 115A, and piston ring 112B sits in groove 115B as shown. Each piston ring 112 biases against the outer ring seal wall 110, and remains stationary even as the flow distributor 50 rotates. Pressurized air (or gas) flows through the radial ducts 83 as shown by the arrows in FIG. 14, through apertures 84 communicating with each radial duct 83, and into the channel 119 between the piston rings 112A, 112B, as well as in the gap between each piston ring 112 and the inner ring seal 116. As the flow distributor rotates with respect to stationary cylindrical wall 110 (and the piston rings 112A, 112B), the air in channel 119 pressurizes the space between the two piston rings 112A, 112B, creating a continuous and non-friction seal. The gap between the piston rings 112 and the inner piston seal 116, and the gap 85 between the inner piston seal 116 and the wall 110, accommodate any movement (axial or otherwise) in the drive shaft 52 due to thermal growth or other factors. Those skilled in the art will appreciate that although a dual piston ring seal is shown, three or more piston rings also could be employed for further sealing. Positive or negative pressure can be used to seal.

Figure 15:
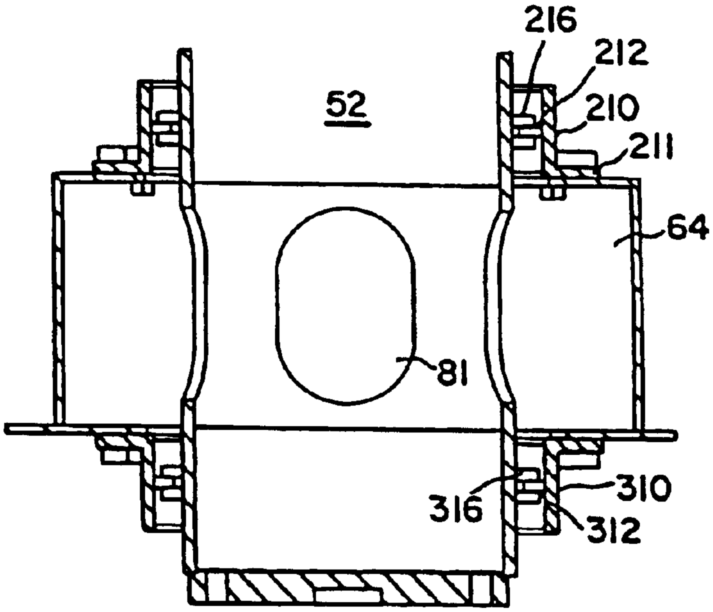
FIG. 15 is a cross-sectional view of the lower portion of the drive shaft of the flow distributor suitable for use with the present invention.

FIG. 15 illustrates how the plenum 64 feeding the shaft 52 with pressurized air is sealed against the drive shaft 52. The sealing is in a manner similar to the rotating port discussed above, except that the seals are not pressurized, and only one piston ring need by used for each seal above and below the plenum 64. Using the seal above the plenum 64 as exemplary, a C-shaped inner ring seal 216 is formed by boring a central groove therein. A stationary annular cylindrical wall 210 that functions as an outer ring seal includes an outer annular flange 211 used to center the wall 210 and clamp it to the plenum 64. A stationary piston ring 212 sits in the groove formed in the C-shaped inner ring seal 216 and biases against the wall 210. The gap between the piston ring 212 and the bore of the C-shaped inner seal 216, as well as the gap between the C-shaped inner seal 216 and the outer cylindrical wall 210, accommodates any movement of the drive shaft 52 due to thermal expansion or the like. A similar cylindrical wall 310, C-shaped inner seal 316 and piston ring 312 is used on the opposite side of the plenum 64 as shown in FIG. 15.

Figure 16:
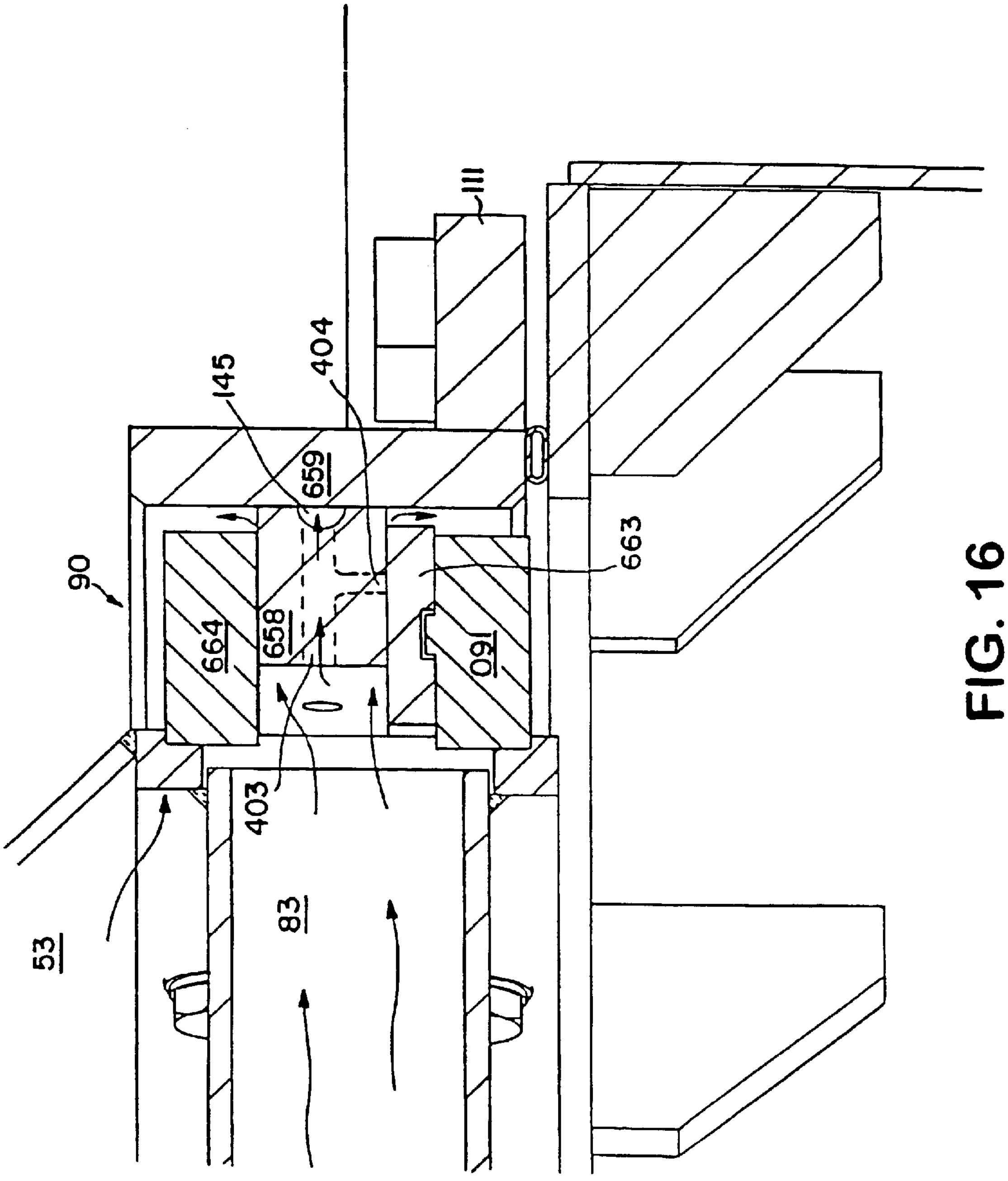
FIG. 16 is a cross-sectional view of the rotating port of a valve suitable for use with the present invention.
Figure 16A:
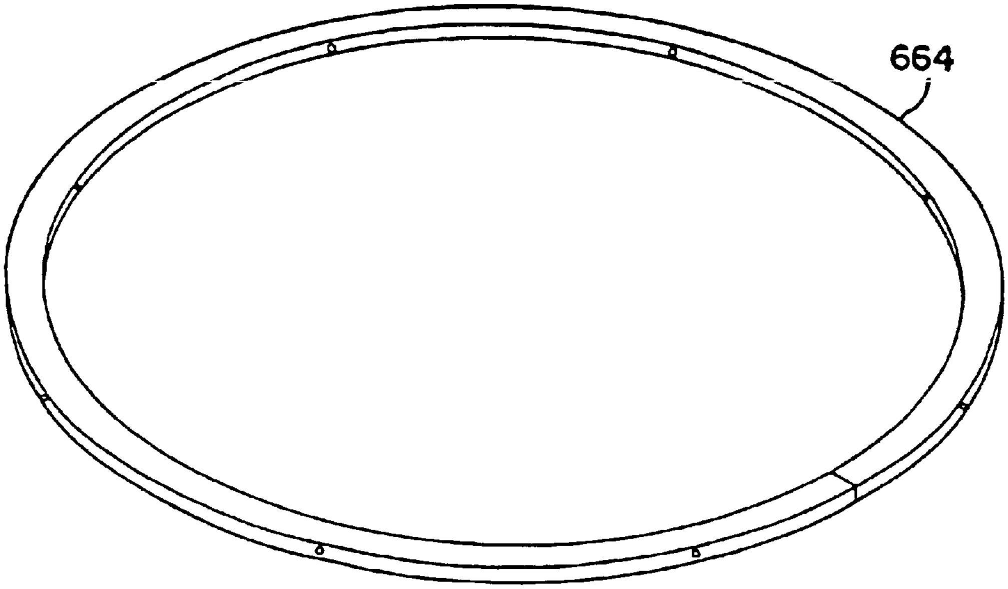
FIG. 16A is a perspective view of the retaining ring for sealing a valve suitable for use with the present invention.
Figure 16B:
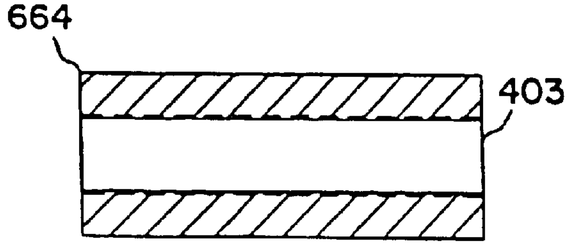
FIG. 16B is a cross-sectional view of the retaining ring of FIG. 16A.
Figure 16C:
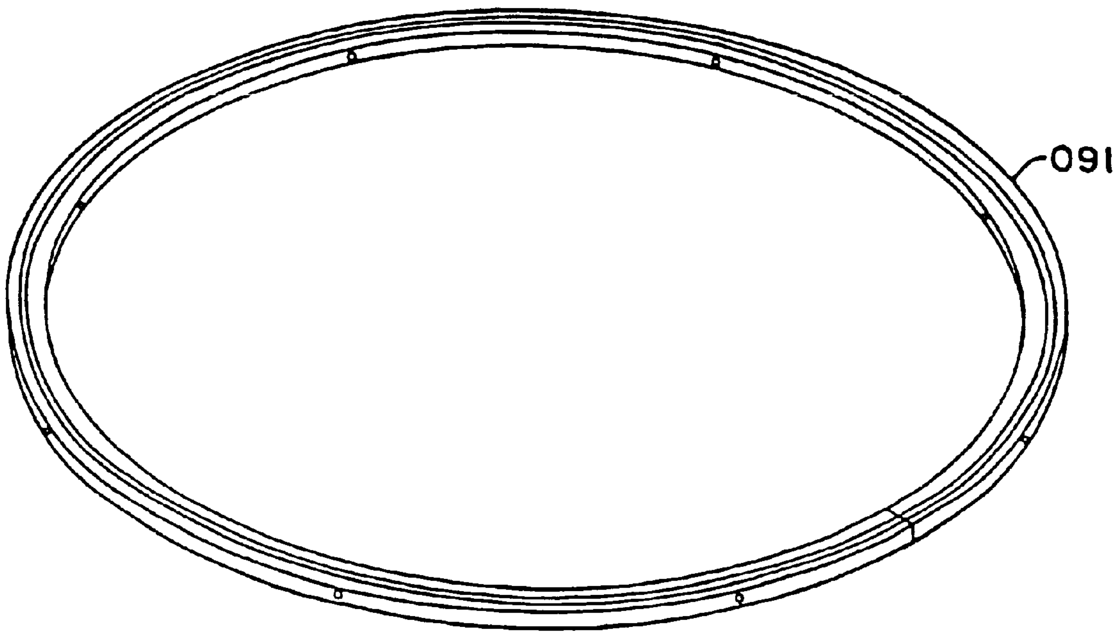
FIG. 16C is a perspective view of the mounting ring for sealing a valve suitable for use with the present invention.
Figure 16D:
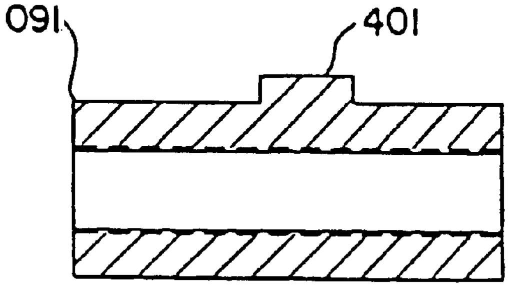
FIG. 16D is a cross-sectional view of the mounting ring of FIG. 16C.
Figure 16E:
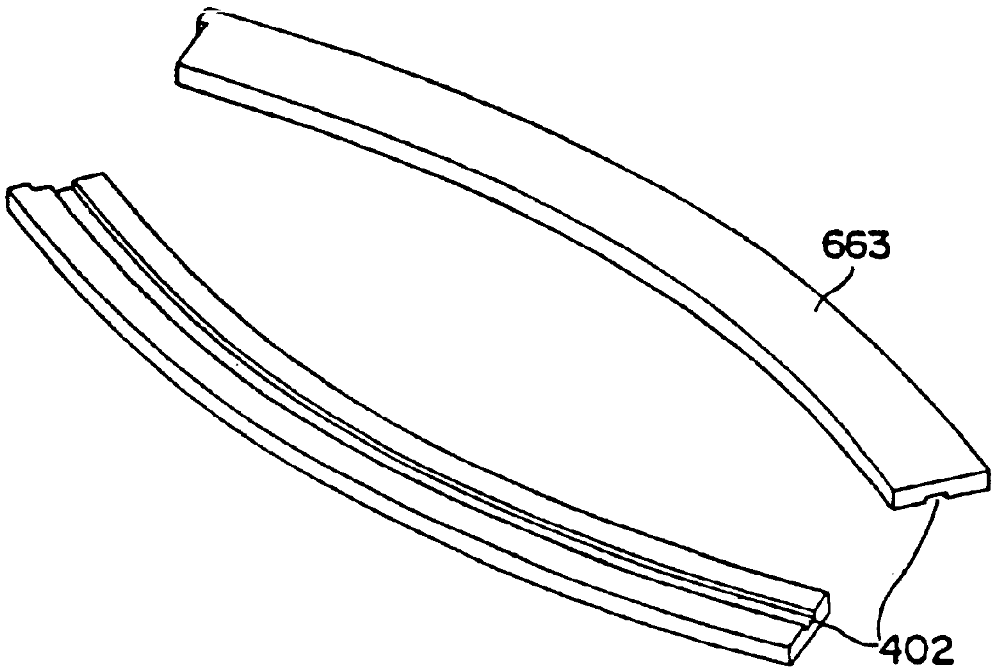
FIG. 16E is a perspective view of the plate bearing arc for valve suitable for use with the present invention.
Figure 16F:
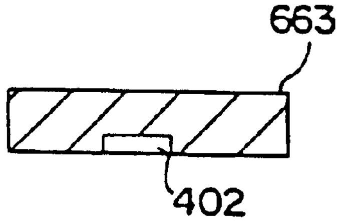
FIG. 16F is a cross-sectional view of the plate bearing arc of FIG. 16E.
Figure 16G:
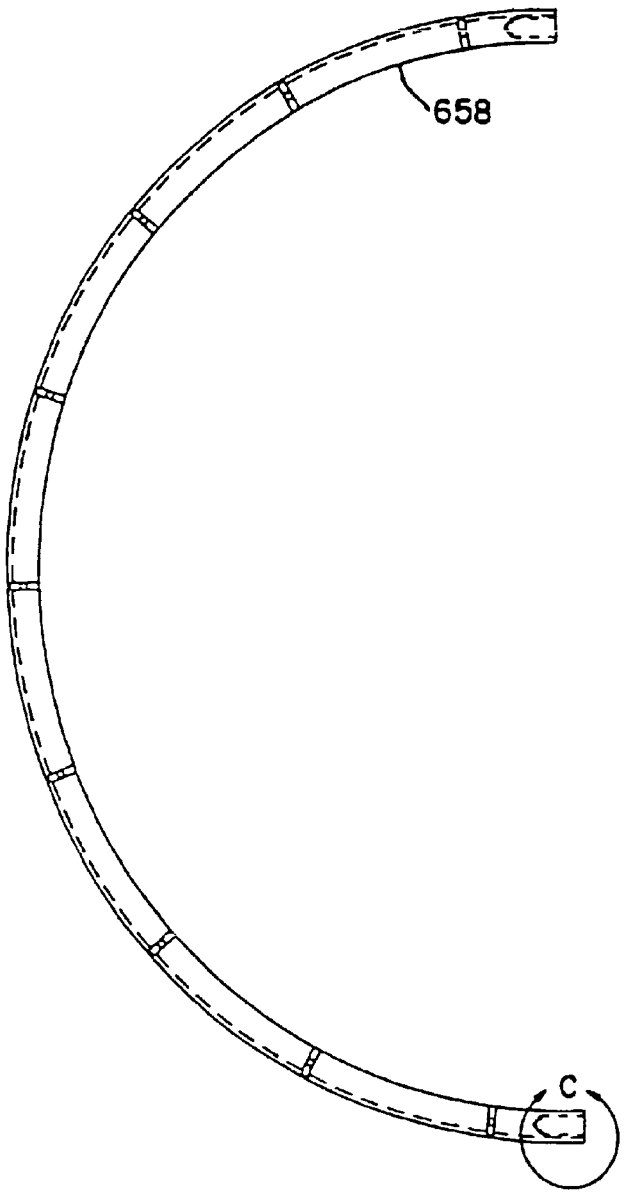
FIG. 16G is a perspective view of one embodiment of the seal ring for a valve suitable for use with the present invention.
Figure 16H:
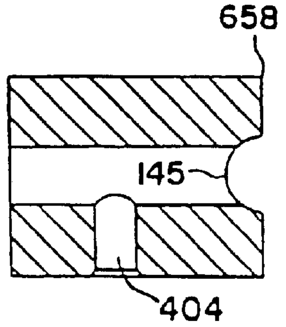
FIG. 16H is a cross-sectional view of the seal ring of FIG. 16G.
Figure 16I:
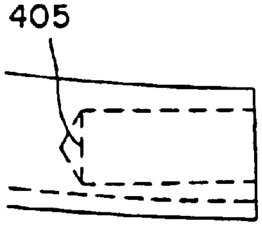
FIG. 16I is a cross-sectional view of the recess in the seal ring of FIG. 16G.

An alternative embodiment for sealing is shown in FIGS. 16–16I and is as shown in co-pending U.S. patent application Ser. No. 09/849,785, the disclosure of which is hereby incorporated by reference. Turning first to FIG. 16, retaining ring seal 664, preferably made of carbon steel, is shown attached to rotating assembly 53. The retaining seal ring 664 is preferably a split ring as shown in perspective view in FIG. 16A, and has a cross-section as shown in FIG. 16B. Splitting the ring facilitates installation and removal. The retaining seal ring 664 can be attached to the rotating assembly 53 with a cap screw 140, although other suitable means for attaching the ring 664 could be used. Preferably, the rotating assembly includes a groove for properly positioning the retaining ring seal in place.

Opposite retaining seal ring 664 is mounting ring 091, best seen in FIGS. 16C and 16D. The mounting ring 091 is also coupled to rotating assembly 53 with cap screw 140', and a groove for properly positioning the mounting ring 091 is formed in the rotating assembly.

In the embodiment shown, where the rotating assembly rotates about a vertical axis, the weight of the seal ring 658 can result in wear as it slides against the mounting ring 091. In order to reduce or eliminate this wear, the mounting ring 663 is formed with a tongue 401 formed along its circumference, preferably centrally located as best shown in FIG. 16D. An optional plate-bearing arc 663 has a groove 402 (FIGS. 16E, 16F) corresponding in shape and location to the tongue 401, and seats over the mounting ring 091 when assembled as shown in FIG. 16. The plate-bearing arc 663 is preferably made of a material different from seal ring 658 to facilitate its function as a bearing. Suitable materials include bronze, ceramic, or other metal different from the metal used as the material for seal ring 658.

Positioned between retaining seal ring 664 and arc 663 is seal ring 658. As shown in FIGS. 16G and 16H, the seal ring 658 has a radial slot 403 formed throughout its circumference. At one edge of the seal ring 658, the radial slot 403 terminates in a circumferential semi-circular configuration, so that a distribution groove 145 is created when the seal ring 658 abuts against the ring seal housing 659, as shown in FIG. 16. Alternatively, more than one radial slot 403 could be used. In the embodiment shown, ring seal 658 also has a bore 404 formed in communication with and orthogonally to radial slot 403. By pressurizing this bore 404, a counterbalance is created whereby the seal ring 658 is inhibited from moving downwardly due to its own weight. If the orientation of the valve were different, such as rotated 180°, the bore 404 could be formed in the upper portion of seal ring 658. Alternatively, more than one bore 404 could e used in the upper or lower portions, or both. If the orientation were rotated 90°, for example, no counterbalance would be necessary. Since seal ring 658 remains stationary and the housing is stationary, seal 658 need not be round; other shapes including oval and octagonal also are suitable. The ring seal 658 can be made of a single piece, or could be two or more pieces.

The ring seal 658 biases against ring seal housing 659, and remains stationary even as the flow distributor 50 (and seal ring 664, plate bearing 663 and mounting ring 091) rotates. Pressurized air (or gas) flows through the radial ducts 83 as shown by the arrows in FIG. 16, and into the radial slot 403 and bore 404, as well as in the distribution groove 145 between the ring seal 658 and housing 659, the gap between the retaining ring seal 664 and housing 659, and the gaps between the arc 663 and housing 659 and mounting ring 091 and housing 659. As the flow distributor rotates with respect to stationary housing 659 (and the stationary seal ring 658), the air in these gaps pressurizes these spaces creating a continuous and non-friction seal. The distribution groove 145 divides the outside surface of the ring seal 658 into three zones, with two in contact with the outer bore, and a center pressure zone.

By using a single sealing ring assembly, forces which push or pull dual piston ring seals apart are eliminated. In addition, a savings is realized as the number parts are reduced, and a single ring can be made of a larger cross-section and thereby can be made from more dimensionally stable components. The ring can be split into two halves to allow for easier installation and replacement. Compression springs or other biasing means can be placed in recessed holes 405 (FIG. 16I) at the split to provide outward force of the ring to the bore.

FIG. 15 illustrates how the plenum 64 feeding the shaft 52 with pressurized air is sealed against the drive shaft 52. The sealing is in a manner similar to the rotating port discussed above, except that the seals are not pressurized, and only one piston ring need by used for each seal above and below the plenum 64. Using the seal above the plenum 64 as exemplary, a C-shaped inner ring seal 216 is formed by boring a central groove therein. A stationary annular cylindrical wall 210 that functions as an outer ring seal includes an outer annular flange 211 used to center the wall 210 and clamp it to the plenum 64. A stationary piston ring 212 sits in the groove formed in the C-shaped inner ring seal 216 and biases against the wall 210. The gap between the piston ring 212 and the bore of the C-shaped inner seal 216, as well as the gap between the C-shaped inner seal 216 and the outer cylindrical wall 210, accommodates any movement of the drive shaft 52 due to thermal expansion or the like. A similar cylindrical wall 310, C-shaped inner seal 316 and piston ring 312 is used on the opposite side of the plenum 64 as shown in FIG. 15.

Figure 8:
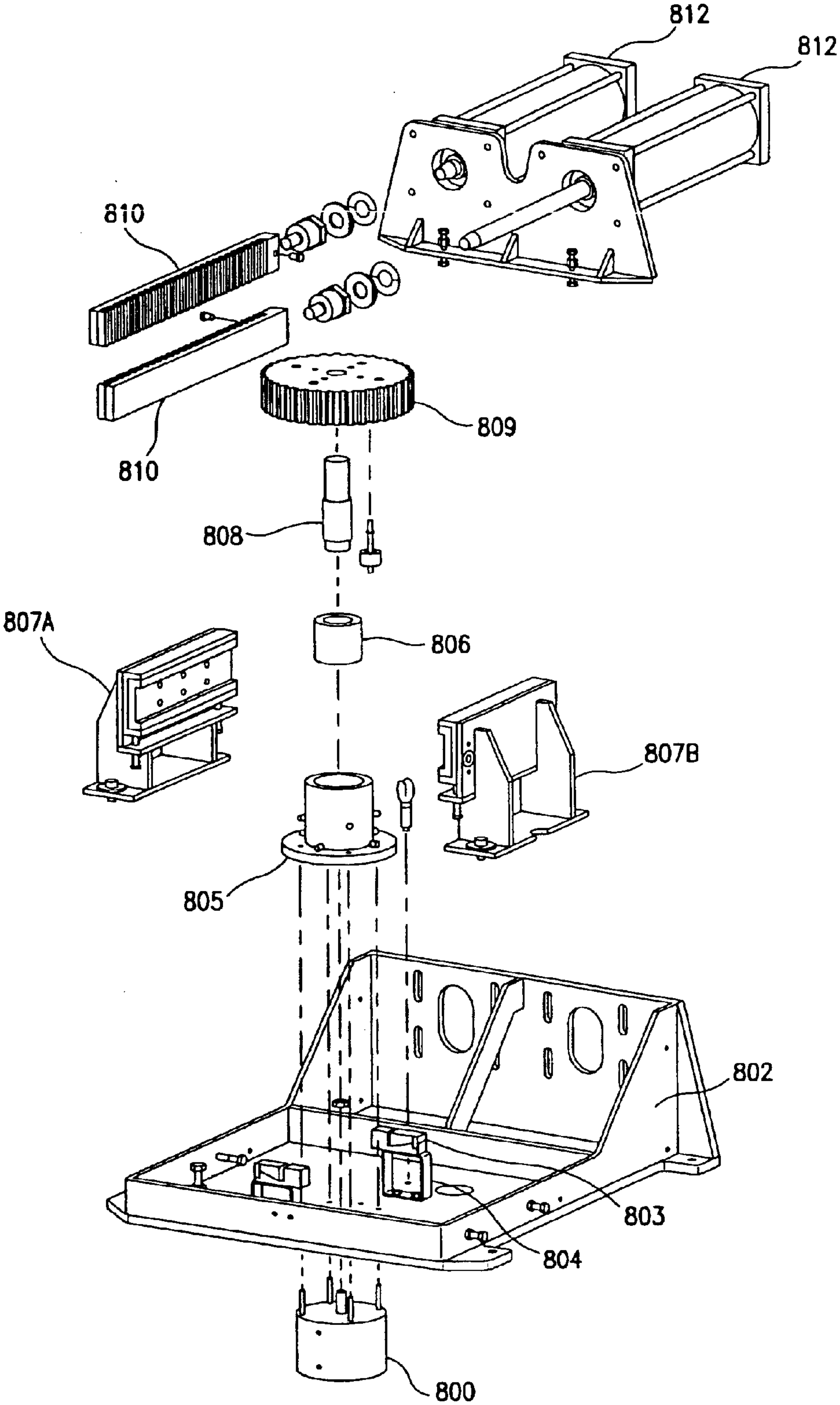
FIG. 8 is an exploded view of a drive mechanism suitable for use in the present invention.
Figure 9:
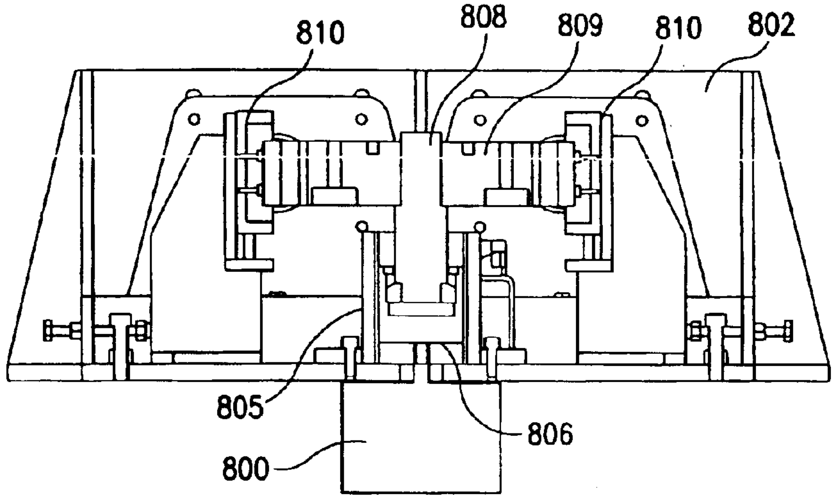
FIG. 9 is a cross-sectional view of a portion of the drive mechanism of FIG. 8.
Figure 10:
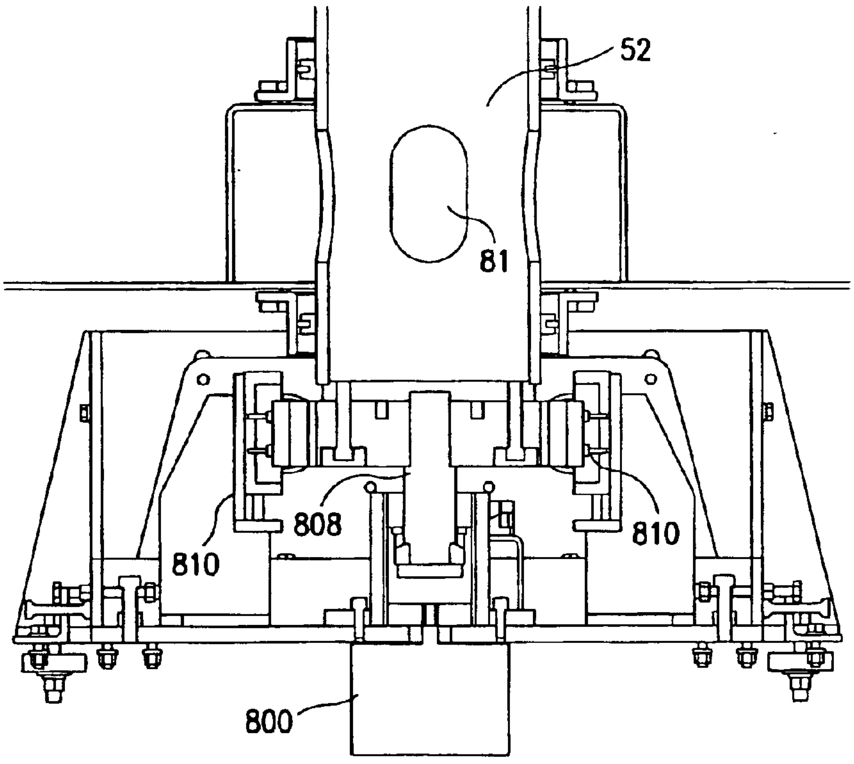
FIG. 10 is a cross-sectional view of the drive shaft of the valve of the present invention shown coupled to the drive mechanism of FIG. 8.

Turning now to FIGS. 8 and 9, details of a suitable drive mechanism for the flow distributor 50 are provided. Air cylinder 800 is positioned below drive base 802 and coupled thereto such as with threaded rods that attach to bushing 805 that houses bearing 806. Base 802 also supports a proximity sensor 803 on bracket 804 as shown, and opposite gear rack support brackets 807A, 807B. Pilot shaft 808 is received in bearing 806. Spur gear 809 is has a central aperture that receives shaft 808 for rotation of the gear. A pair of opposite gear racks 810 each have a plurality of teeth that mate with gears in spur gear 809 when properly positioned on opposite sides of the gear 809. Each gear rack 810 is attached, with suitable couplings, to a respective air cylinder 812 for actuation of the racks.

Figure 11:
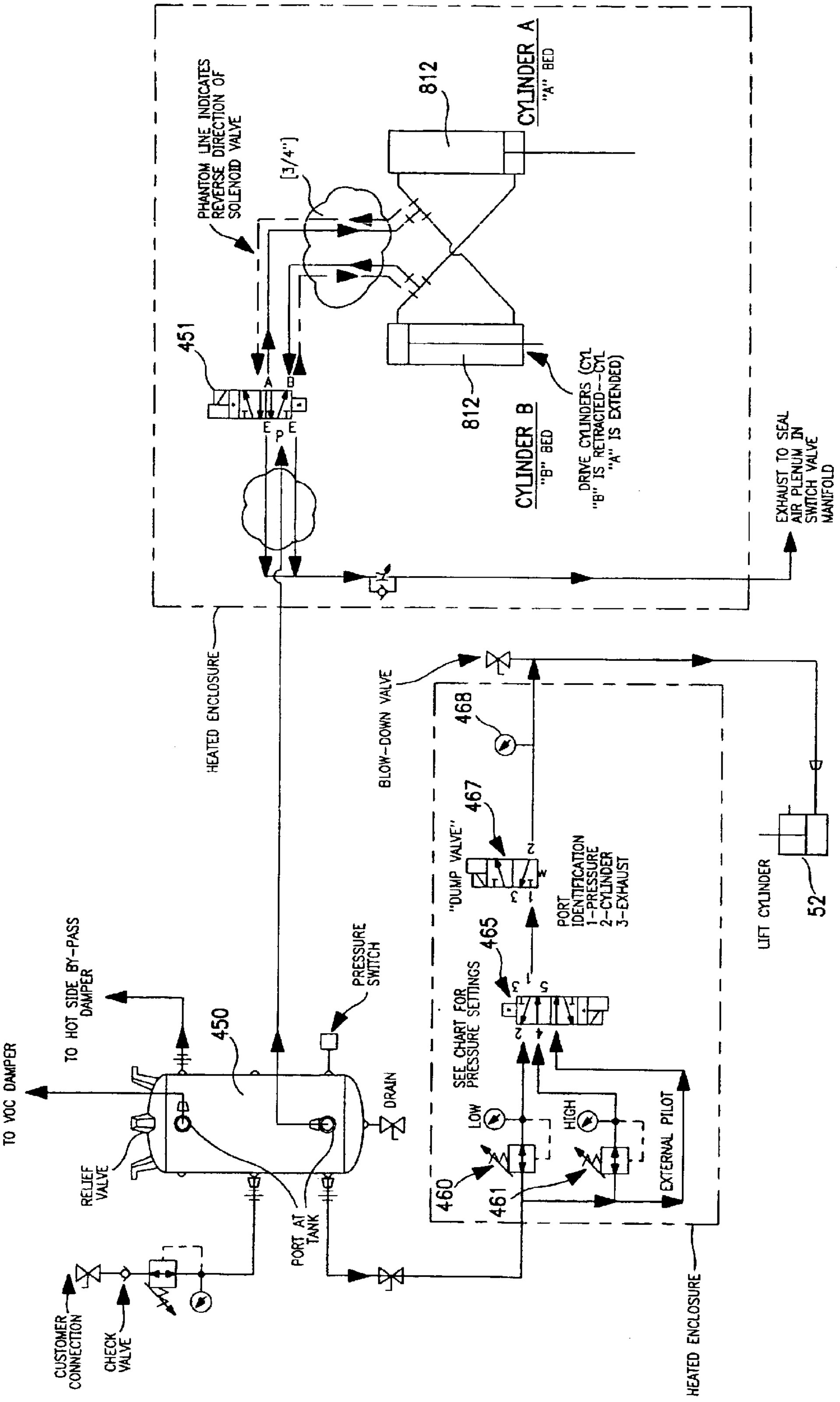
FIG. 11 is a schematic diagram of a lift system in accordance with one embodiment of the present invention.

Operation of the force or counter-force used in accordance with the present invention to result in frictionless or virtually frictionless valve movement will now be described with reference to FIG. 11. Air tank 450 holds compressed air, preferably at least about 80 pounds. The air tank 450 is in fluid communication with the cylinders 812 of the drive mechanism that move the valve back-and-forth as described above. Actuation of the cylinders 812 is controlled by solenoid 451. Air tank 450 (or a different air tank) also supplies compressed air to low pressure regulator 460 and to high pressure regulator 461 as shown. The regulators 460, 461 are in communication with switch 465, which is preferably a solenoid. The solenoid switches feed air pressure between the two regulators. An optional dump valve 467 can be used as a safety measure. In the event of a power outage, for example, the dump valve 467 will block the flow of compressed air used for sealing the valve, causing the valve to fall and thereby opening the pathways, so as to prevent excessive heat build-up in any one of the regenerative oxidizer beds. A pressure gauge 468, pressure transmitter and a low pressure safety switch also can be used to monitor pressure and to reduce pressure as a safety precaution in the event of failure.

In operation in the context of a regenerative thermal oxidizer, the flow distributor 50 is in the stationary sealed position most of the time (e.g., about 3 minutes), and is in a movement mode only during cycling (e.g., about 3 seconds). When stationary, relatively high pressure is applied through high pressure regulator 461, valve 465 and drive shaft 52 to seal the flow distributor against the valve seat (i.e., seal plate 100). The pressure applied must be sufficient to counter the weight of the flow distributor and seal it against the valve seat. Prior to valve movement, such as about 2–5 seconds prior, the solenoid 465 switches from feeding air from the high pressure regulator 461 to feeding air from the low pressure regulator 460, thereby reducing the pressure applied to the flow distributor (through drive shaft 52) and allowing the flow distributor to "float" for subsequent frictionless or near frictionless movement to its next position. Once that next position is reached, the solenoid 465 switches back from feeding air from the low pressure regulator to feeding air from the high pressure regulator and pressure sufficient to again seal the valve is applied through the drive shaft 52.

The particular pressures applied by the low and high pressure regulators depend in part on the size of the flow distributor, and readily can be determined by those skilled in the art. By way of illustration, for a valve capable of handling 6000 cfm of flow, a low pressure of 15 psi and a high (seal) pressure of 40 psi has been found to be suitable. For a valve capable of handling 10,000 to 15,000 cfm of flow, a low pressure of 28 psi and a high pressure of 50 psi has been found to be suitable. For a valve capable of handling 20,000 to 30,000 cfm of flow, a low pressure of 42 psi and a high pressure of 80 psi has been found to be suitable. For a valve capable of handling 35,000 to 60,000 cfm of flow, a low pressure of 60 psi and a high pressure of 80 psi has been found to be suitable.

Figure 11A:
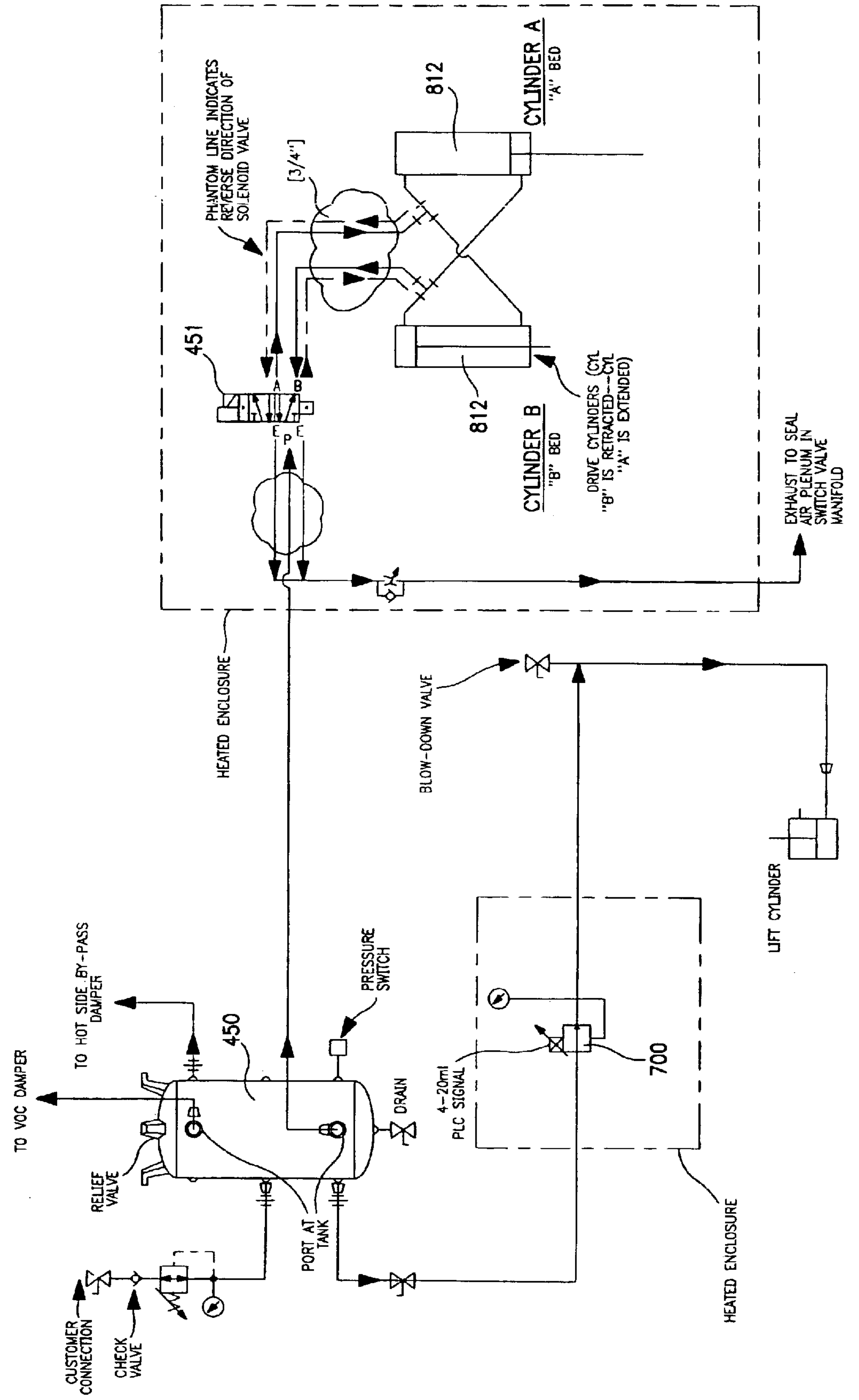
FIG. 11A is a schematic diagram of a lift system in accordance with another embodiment of the present invention.

In another embodiment of the present invention, an analog system is used to deliver the appropriate pressure to the drive shaft 52 to seal and unseal the valve 50. For example, with reference to FIG. 11A, when the valve is in the seal mode, a signal can be sent to a pressure transmitter in communication with a regulator, such as an electro-pneumatic pressure regulator 700 preferably located in a heated enclosure. This causes the regulator 700 to allow a certain pressure to be applied to seal the flow distributor 50. At or immediately prior to movement of the flow distributor, the pressure transmitter instructs the regulator 70 to reduce or eliminate the sealing pressure so that the flow distributor 50 can move without contact with the seal plate 100. Thus, the regulator regulates the output air pressure based on a control signal that allows the delivery of air pressure in a range from zero to 100%. If the control signal is removed (i.e., goes to zero), then the regulator reduces the output pressure to zero, causing the flow distributor to drop down and break the seal from one chamber to the other.

The amount of pressure applied to either lift and seal the flow distributor 50 or lower and unseal the flow distributor 50 can be controlled by a programmable logic controller (PLC) in communication with the pressure transmitter. This allows for added flexibility, as a precise amount of pressure to be applied can be inputted depending upon the circumstances. For example, at lower gas flow through the oxidizer, less pressure may be needed to seal the valve. The PLC can modify the amount of pressure supplied to seal the valve based upon various modes of operation. These modes of operation can be directed from, or sensed by, the PLC, and can be continuously or continually monitored and adjusted over time. For example, pressure can be reduced during "bakeout" mode to allow the valve to expand easily during high temperature operation. Also, the pressure can be reduced or increased based on changes to gas flow throughput of the oxidizer. This can be done to compensate for aerodynamic characteristics of the valve (e.g., its tendency to lift or fall from air pressure). It also could be that high sealing pressures are needed at lower flows. This embodiment also provides an inherent safety feature, since if the flow suddenly drops or stops completely, the pressure transmitter can immediately reduce the seal pressure to zero, which causes the valve 50 to drop. The amount of pressure applied also can be monitored and inputted remotely.

Figure 12:
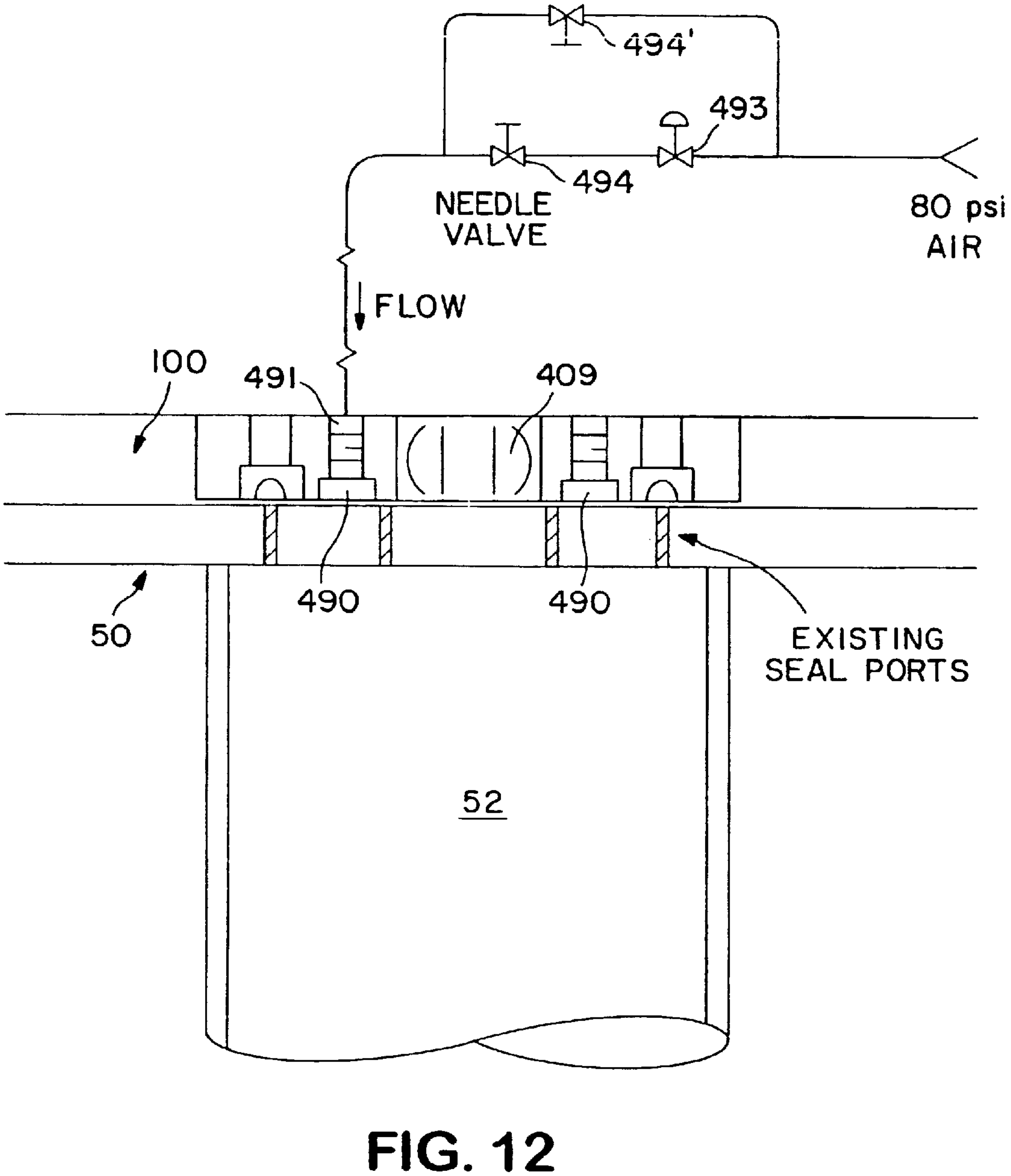
FIG. 12 is cross-sectional view of a lift system in accordance with an alternative embodiment of the present invention.

FIG. 12 illustrates an alternative embodiment of the present invention. In this embodiment, the sealing pressure in drive shaft 52 of the flow distributor 50 is constantly applied, and a counter-force is used to offset the sealing pressure during valve movement. In the embodiment shown, this counter-force is applied as follows. An annular cavity or groove 490 (shown in cross-section) is formed in seal plate 100. The annular groove 490 is in fluid communication, via port 491, with compressed air from a source 495. At or immediately prior (e.g., 0.5 seconds) to valve movement, solenoid 493 is activated and compressed air is caused to flow through flow control valve 494 and into the annular groove 490 through port 491. Sufficient pressure is applied and spread across the top of the valve by the groove 490 to offset the sealing pressure biasing the valve to the sealed position. This creates a gap between the seal plate 100 and the top of the flow distributor 50 so that during movement, the flow distributor and seal plate do no contact each other. Upon the completion of movement, the flow of air in the annular groove is reduced or terminated until the next cycle. As a result, the high seal pressure again seals the flow distributor against the seal plate. Those skilled in the art will be able to readily determine the pressure necessary to offset the high seal pressure.

Optionally, the compressed air used to apply the counter-force also can be used to cool the drive shaft bearing 409. To that end, a cooling loop is shown that supplies compressed air to the bearing 409 via flow control valve 494'.

Figure 13:
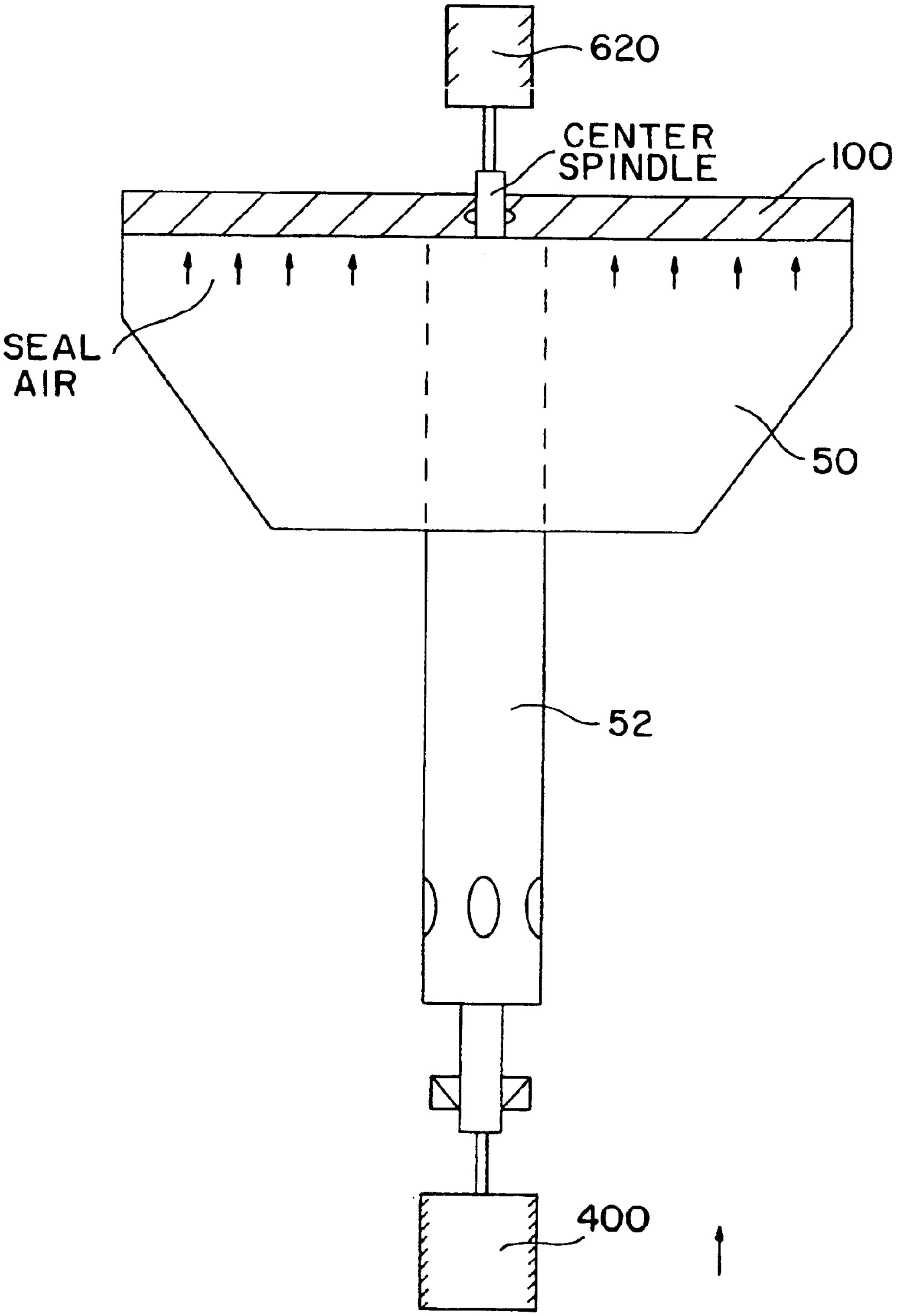
FIG. 13 is a schematic view of the lift system in accordance with another alternative embodiment of the present invention.

Alternative methods of applying a counter-force to overcome the high sealing force can be used and are within the scope of the present invention. For example, FIG. 13 illustrates a cylinder 620 positioned so that upon actuation, the flow distributor 50 is forced away from the seal plate 100. Thus, the cylinder 620 can push against pin 59 (FIG. 5) of the center spindle of the flow distributor 50 with sufficient force to counter the high pressure sealing force during valve movement. Once the flow distributor is positioned in its new location, the cylinder can be retracted until the next cycle.

In a still further embodiment, magnet force can be used to both draw the flow distributor into sealing relation with the seal plate 100, and to move it out of sealing relation during valve movement. For example, an electromagnet positioned in the seal plate 100 can be energized to seal the valve and de-energized during valve movement to allow the flow distributor to drop out of sealing relation with the seal plate for frictionless movement.

As stated previously, the present invention can be used with other valves where air or gas is used for sealing. For example, poppet valves can be sealed against a valve seat with a lift cylinder similar to drive shaft 52. The amount of pressure used to seal the valve can be adjusted using the system of the present invention depending upon the process conditions. Thus, in a particular regenerative thermal oxidizer application, if the flow rate of process gas is lower than normal, the pressure used to seal the poppet valve can be reduced (relative to that necessary when the process gas flow rate is higher) while still obtaining adequate sealing. This can help extend the life of the poppet valve by reducing wear.

What is claimed is:

1. A system for reducing friction during movement of a valve, comprising:

a flow distributor;

a valve seat;

a drive associated with said flow distributor for moving said flow distributor from a first stationary position to a second stationary position;

a source of compressed gas in fluid communication with said flow distributor;

a first regulator for supplying said compressed gas to said flow distributor at a first pressure sufficient to seal said flow distributor against said valve seat when said flow distributor is in either said first or said second stationary position; and a second regulator for supplying said compressed gas to said flow distributor at a second pressure less than said first pressure when said flow distributor moves between said first and second stationary positions.

2. The system of claim 1, further comprising a solenoid in communication with said first and second regulators for alternating which said regulator supplies said compressed gas to said flow distributor.

3. The system of claim 2, further comprising a dump valve downstream of said solenoid for selectively preventing the flow of compressed air to said flow distributor.

4. The system of claim 1, wherein said drive comprises a hollow drive shaft, and wherein said compressed air is in fluid communication with said flow distributor through said hollow drive shaft.

5. The system of claim 1, wherein said flow distributor comprises a top surface having a plurality of apertures, and wherein said seal is formed by said compressed air flowing out said apertures and creating an air cushion between said top surface and said valve seat.

6. A system for reducing friction during movement of a valve, comprising:

a flow distributor;

a valve seat;

a drive associated with said flow distributor for moving said flow distributor from a first stationary position to a second stationary position;

a source of compressed gas in fluid communication with said flow distributor;

a pressure regulator for supplying said compressed gas to said flow distributor at a first pressure sufficient to seal said flow distributor against said valve seat when said flow distributor is in either said first or said second stationary position and for supplying said compressed gas to said flow distributor at a second pressure less than said first pressure when said flow distributor moves between said first and second stationary positions.

* * * * *